United States Patent [19]

Fauck et al.

[11] Patent Number: 4,666,217
[45] Date of Patent: May 19, 1987

[54] LOAD CONTROLLER BRAKE FORCE CONTROLLER FOR PNEUMATIC MOTOR VEHICLE OR MOTOR VEHICLE TRAILER BRAKE SYSTEMS

[75] Inventors: Gerhard Fauck, Hanover; Wolfgang Pohl, Garbsen; Helmut Ulrich, Springe, all of Fed. Rep. of Germany

[73] Assignee: Wabco Westinghouse, Hanover, Fed. Rep. of Germany

[21] Appl. No.: 679,425

[22] Filed: Dec. 7, 1984

[30] Foreign Application Priority Data

Dec. 12, 1983 [DE] Fed. Rep. of Germany ....... 3344838

[51] Int. Cl.$^4$ ............................................. B60T 8/22
[52] U.S. Cl. .................................... 303/22 R; 303/40
[58] Field of Search .............. 303/6 C, 7, 22 R, 23 R, 303/40, 54

[56] References Cited

U.S. PATENT DOCUMENTS 4,324,436  4/1982  Reinecke ........................... 303/22 R
4,418,965  12/1983  Reinecke ........................... 303/22 R

FOREIGN PATENT DOCUMENTS

1655774  8/1972  Fed. Rep. of Germany .
2726520  12/1978  Fed. Rep. of Germany .
2739884  3/1979  Fed. Rep. of Germany .
2756405  6/1979  Fed. Rep. of Germany .

Primary Examiner—Duane A. Reger

[57] ABSTRACT

The invention relates to a load-controlled brake force controller system for a pneumatically operated brake for tractor and/or trailer vehicles. A housing includes a load-controlled brake pressure controller for regulating the control pressure released by a brake valve as a function of the load sustained by the vehicle. A relay valve connected in series relationship with the brake pressure controller to cause compressed air to be introduced to the brake from a reservoir when the brake valve is activated. The relay valve being activated by a relay piston which is pressurized toward an open direction of the relay valve by a modulated pressure and toward a closed direction of the relay valve by the braking pressure in an outlet chamber which is connected to the brakes and which can be connected by the relay valve to the reservoir. A graduated piston for providing a graduated increase of the brake pressure beyond the value corresponding to the current control ratio up to the available supply pressure and being adapted to go into operation at a predetermined control pressure.

19 Claims, 4 Drawing Figures

LOAD CONTROLLER BRAKE FORCE CONTROLLER FOR PNEUMATIC MOTOR VEHICLE OR MOTOR VEHICLE TRAILER BRAKE SYSTEMS

FIELD OF THE INVENTION

The invention relates to a load-controlled brake force controller for pneumatic tractor and/or trailer vehicle brake systems.

BACKGROUND OF THE INVENTION

In certain load-controlled braking apparatus, such as shown and disclosed in published German Patent Application DE-AS No. 27 39 884, which corresponds to British Pat. No. 2,003,566, there is equipment for controlling the brakes of vehicles. In this previous system, the load-controlled braking apparatus controls a braking pressure specified for the wheel brakes of one or more vehicle axles in relation to a control pressure originating from a brake valve by means of a control valve in accordance with a ratio which is a function of the load status of the vehicle.

The regulation is accomplished by a control piston which controls the control valve having a control surface pressurized by the control pressure and a reaction surface on which the regulated pressure is exerted. The size of the reaction surface can be varied as a function of the load. The control ratio is a function of the surface ratio between the reaction surface and the control surface which varies with the size of the reaction surface which is also a function of the load.

In the same housing as the control valve, there is provided a relay valve which can be activated by means of a relay piston which is pressurized directly in the open direction of the relay valve by the pressure released by the control valve. The relay valve releases from a reservoir via brake connections so that braking pressure on the wheel brakes is essentially identical to the pressure released by the control valve.

Thus, a family of characteristic curves of this load-controlled brake apparatus consists of a family of straight lines with each corresponding to a load status of the vehicle.

There are applications for vehicles in which, on account of government requirements, for example, there is a need in emergency situations for the brake pressure released in the vehicle to be gradually controllable, up to the full available delivery pressure. Since on vehicles with load-controlled braking systems of the type described above, the brake pressure cannot increase above that corresponding to the current load status, this requirement can only be met on vehicles equipped in this manner with additional separate valve and/or switching equipment.

OBJECTS AND SUMMARY OF THE INVENTION

The problem addressed by the invention is, therefore, the improvement of a load-controlled braking apparatus of the type described above so that the above-mentioned requirement can be met with simple means and without additional separate valve and/or switching equipment.

An object on which the invention is based is the definition of an emergency situation by a predetermined value of the control pressure and, when this value is surpassed, an increase of the brake pressure, and thereby a deflection of the currently-valid control characteristic in the direction of a higher braking pressure until there is a modulation of the full available delivery pressure.

For the achievement of such a characteristic it would be conceivable, when the control pressure defining the emergency situation occurs, of intervening in the transmission equipment of the load status, e.g., a mechanical transmission is conveyed by a control apparatus to move the control lever in the direction "full load".

The preferred embodiment of the invention, however, is most advantageously addressed in the area of the relay valve and on the control valve.

An advantageously simple embodiment of the invention is achieved by simply stating that a predetermined absolute value of the control pressure defines the emergency situation.

For the definition of the emergency situation, it may also be simply stated that a predetermined ratio between the control pressure and the supply pressure can be used, by means of which, even if the feed pressure fluctuates, control of the supply pressure to the brakes is always guaranteed.

A preferred model provides that after the onset of the emergency situation, the relay valve is controlled by a second activation mechanism.

The second preferred model provides that the relay piston be configured as a differential piston with a large control surface and a smaller reaction surface, and pressurizing the differential surfaces up to a maximum value with the control pressure determined by a pressure-relief valve.

The third preferred model proposes that, after the onset of the emergency situation, the control valve is controlled by two activation mechanisms.

It is apparent that the invention and the preferred models can also be executed with configurations of the relay valve and/or the relay piston which increase the pressure or decrease the pressure, based on the design of the system.

A load-controlled braking system as described by the invention can also be provided with an entrance device, which would guarantee a rapid overriding of the response pressure in the wheel brakes. The entrance device can also be equipped with an additional graduated chamber pressurized by the control pressure, which advantageously expands the range of possible control ratios.

Briefly, the present invention provides a load-controlled brake force controller system for pneumatically operated wheel brakes of a vehicle and/or trailer braking system comprising a housing including a load-controlled brake pressure controller for regulating the control pressure released by a braking valve as a function of the load, a relay valve connected in series relationship with the brake pressure controller to cause compressed air to be introduced to the wheel brakes from a reservoir when the brake valve is activated, the relay valve being activated toward an open direction of the relay valve by a modulated pressure and toward a close direction of the relay valve by the braking pressure in an outlet chamber which is connected to the wheel brakes and which can be connected by the relay valve to the reservoir means for providing a graduated increase of the brake pressure beyond the value corresponding to the current control ratio up to the available supply pressure, the means being adapted to go into operation at a predetermined control pressure.

BRIEF DESCRIPTION OF THE DRAWINGS

The invention is explained below by reference to several embodiments which are illustrated in the drawings.

DETAILED DESCRIPTION OF THE INVENTION

Figure 1:
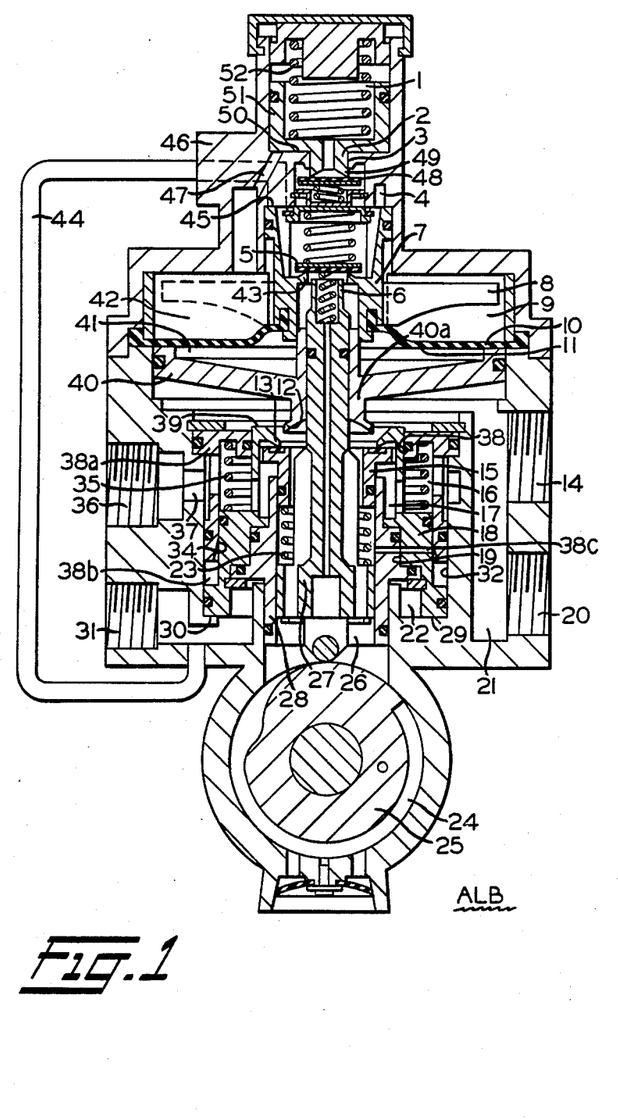
FIG. 1 shows a load-controlled braking apparatus with a second activation mechanism for the relay valve.

Referring now to the drawings, and in particular to FIG. 1, there is shown a front sectional view of a load-controlled braking apparatus having an integrated relay valve which may be called a load-controlled brake force controller or relay ALB.

The ALB relay includes a housing consisting of an upper housing portion 46 and a lower housing portion 33. The housing encases a control piston 7, a flexible diaphragm 10, and a double valve 5, 6, 43 which may be designed as a control valve. The control valve is formed by a double valve body 5 which cooperates with a first valve seat 43 located on the inside wall of the control piston 7 and also with a second valve seat 6 which is formed on the upper end surface of a hollow rod or valve tappet 27 which may be designed as the control element and is located under the double valve body 5.

The control piston 7 includes a number of radial ribs 8 which cooperate in a contactless manner between corresponding ribs 42 which are attached firmly to the upper housing 46 and thus are located between the upper housing 46 and the lower housing 33. The lower end surfaces of the ribs 8 and the ribs 42 facing the diaphragm 10 form portions of envelopes of cones. In the position illustrated, the diaphragm 10 is in contact with the end surfaces of the ribs 42 which are fastened to the housing 46.

The control piston 7 and the membrane 10 form a brake pressure control piston 7, 10 which together with an upper control surface 45 is pressurized by the control pressure while a lower reaction surface 11 is acted on by the pressure released by the control valve 5, 6, 43. The control surface 45 is formed by the upper surface of the control piston 7. The reaction surface consists of the underside of the flexible diaphragm 10. The control surface 45 adjoins a control chamber 4 which is formed in the upper part of the housing 46 and is connected via an external channel or pipe 44 with a control connection 31.

As shown, the upper side of the diaphragm 10 is designated as an accessory surface which, together with the upper housing 46, forms an accessory chamber 9 which is separated from the control chamber 4. The accessory surface has the same surface area as the difference between the control surface 45 and the reaction surface 11.

The reaction surface 11 and the upper or top side of a relay piston 40 form a reaction chamber 41. The piston 40 moves longitudinally and is guided in a sealed manner in the lower or bottom housing portion 33. The amount of upward movement of the relay piston 40 is limited by the bottom ends of the ribs 42 which are part of the housing and which are designed as the second stop formed by the housing.

A valve rod or tappet 27 is in a force-tight connection with a rotatable cam 25 which can be adjusted in a well-known manner according to the load sustained by the vehicle. The hollow tappet member 27 is in communication with an evacuation or exhaust chamber 24 which is common with the cam 25. The valve tappet 27 can be moved through a central aperture formed in the relay piston 40 and is sealed by a suitable O-ring, not characterized.

It will be noted that a radially sealed annular insert or bushing 38a is situated below the relay piston 40. The insert 38a is coaxially disposed in relation with piston 40 and is located in the lower housing portion 33 between a shoulder stop and an axial retaining ring. The insert 38a has a small upper diameter 38, a medium intermediate diameter 34, and a large lower diameter 32. A multistage graduated bore is formed in the lower housing portion 33 to accommodate the upper intermediate and lower outside diameters 38, 34 and 32 of the insert 38a. A hollow graduated piston 18, 19 complements the graduated bore 32, 34, 38 and consists of an outside part 18 and a piston insert 19. The hollow piston 18, 19 is guided in the small and medium diameters and the corresponding surfaces of the insert 38a and also with the large diameter in the bottom part of the housing 33. The piston 18 is suitably sealed by a number of O-rings.

The hollow piston insert 19 is also sealed by suitable O-rings and the graduated piston is axially fixed in the graduated piston 18 by a retaining ring. The bottom surface of the piston insert 19 forms, with the bottom surface of the outside part 18, a second control surface 29 which with the bottom part of the housing 33 forms a second control chamber 22 which is connected with the control connection 31.

The bottom surface of the second control chamber 22 of the housing 33 is designed as a rest or stop 30 for the graduated piston 18, 19.

As shown, there is an exhaust tube 28 located on the inside of the piston insert 19, which is connected with an exhaust passageway or channel 26 in the graduated piston 18, 19. The piston insert 19 is disposed in a sealed manner in the second control chamber 22 formed in the bottom part of the housing 33 which leads to the exhaust chamber 24.

As shown, the upper end of piston insert 19 cooperates with a valve element 15 which is guided in a sealed manner. The inside surfaces of the valve element 15 and the piston insert 19 form the exhaust channel 26. The exhaust channel 26 is adapted to receive or accept the hollow valve tappet 27.

It will be seen that the upper small diameter end of the graduated piston 18, 19 is sealed by an O-ring. The upper surface 39 is tapered in a circular fashion. The lower inside circumference or edge of the circular taper forms an inlet valve seat 13 and cooperates with the valve element 15 to form an inlet valve 13, 15 of a relay valve 12, 13, 15. The valve element 15 is urged against the valve element 13 by a biasing compression spring 23.

The relay piston 40 includes on its underside, which is adjacent the valve element 15, a hollow tappet portion 40a. The bottom end surface or edge of the tappet 40a forms an outlet valve seat 12. The valve seat 12 along with the valve element 15 forms an outlet valve 12, 15 of the relay valve 12, 13, 15.

As shown, located between the graduated piston 19, 18 and the insert 38a, there is a restoring or reaction chamber 16 which is designed as an annular compartment. A piston delivery chamber 17 is encompassed between the outer part 18, the piston insert 19, and the valve element 15. In the restoring or reaction chamber 16, there is a restoring spring 35 which is disposed between the graduation of the insert 38a corresponding to the restoring chamber 16 and the graduated piston 18, 19.

In some applications which do not require special response behavior or characteristics, the biasing restoring spring 35 can be omitted for the sake of economy.

It will be seen that another annular chamber 38b is formed between the step of the large diameter of the insert 38a and the graduated piston 18, 19 and is in communication via a transverse duct 38c formed in the graduated piston 18, 19 with the exhaust channel 26. It will be appreciated that the invention can also be practiced with either a one-stage graduated piston without this latter chamber or with a graduated piston including more than two stages.

The lower housing portion 33 is provided with a supply connection 36 which is connectable to the restoring chamber 16 and the piston supply chamber 17. That is, communication is established via a port 37 formed in the lower housing portion 33 and the ports formed in the insert 38a and in the graduated piston 18, 19.

In another possible ramification (not shown), the graduated bores 32, 34, 38 and/or the graduated piston 18, 19 may be designed so that the supply pressure which is conveyed to the annular reaction chamber 16 is in the direction of displacement of the graduated piston 18, 19 so that no external force is exerted on the latter. For this purpose, for example, the graduated piston 18, 19 could define the annular chamber 16 by the upper and lower graduated surfaces, each of which could be the same size. In this proposed arrangement, there would be a control spring disposed between corresponding end and graduation surfaces of the graduated bores and the graduated piston.

It will be seen that an outlet chamber 21 is formed between the graduation surfaces 39 of the graduated piston 18, 19 and the surface of the insert 38a and the underside of the relay piston 40. The outlet chamber 21 is connected to a pair of brake connections 14, 20 leading to the cylinders of the wheel brakes.

As shown, there is located in the upper end of the housing portion 46, an entrance device. The entrance device consists of a hollow entrance piston 51 as well as an entrance valve 3, 48, 49. The entrance valve includes an inlet valve 3, 48 and an outlet valve 48, 49 which are common to a double valve element 48.

As shown, located between the entrance piston 51 and the upper housing 46, there is an entrance chamber 50 which is connected in one instant via the inlet valve 3, 48 to the control chamber 4, and in other instances via a housing channel or passageway 47 to the accessory chamber 9.

When the outlet valve 48, 49 is open, the entrance chamber 50 is connected with an exhaust chamber 1 located above the entrance piston 51 by way of a hollow tappet 2. The tappet 2 cooperates with the outlet valve seat 49 formed on the lower part of the entrance piston 51. The exhaust chamber 1 is vented through a protective cover into the atmosphere.

There is shown, located in the exhaust chamber 1, an adjustable control spring 52. The spring 52 is caged between the upper recessed end of the entrance piston 51 and the protective cover of the exhaust chamber 1. The spring 52 biases the entrance piston 51 toward the open direction of the inlet valve 3, 48.

Let us now describe the detailed operation of the above-noted relay controller ALB.

Now, when the supply connection 36 is connected to a suitable pressure reservoir (not shown) of a vehicle, the reaction chamber 16 and the piston delivery chamber 17 are constantly pressurized. The graduated piston 18, 19 is held against the stop surface 30 by means of a reaction force produced by the supply pressure in the restoring chamber 16 as well as by the reaction force produced by the reaction spring 35 which is located in the corresponding graduation. When the relay ALB becomes operational, the effect of this reaction force is enhanced by the brake pressure acting on the graduated surface 39.

Generally connected to the same supply reservoir, on the supply side, there is a brake valve (not shown), the outlet of which is connected with the control connection 31. The brake connections 14, 20 are in communication with wheel brake cylinders which are not shown.

The size of the reaction surface 11 of the brake pressure control piston 7, 10, and thus the ratio of surface area between the reaction surface 11 and the control surface 45, namely, the control ratio, are a function of the position of the valve tappet 27, which is in turn a function of the load and is dependent upon the position of the cam 25. Depending on the position of the valve tappet 27, a more or less large portion of the reaction surface 11 is against the end surface of the ribs 42, which are part of the housing, and thus disappears as a part of the active reaction surface when pressurization occurs.

In the idle position, i.e., when the vehicle is not braked, the entrance chamber 9, the reaction chamber 41, and the outlet chamber 21 are in equilibrium since no control is conveyed by the brake valve to the control connection 31.

When the control connection 31 is pressurized with a control pressure supplied by the brake valve, the function of the relay ALB proceeds in three phases as the control pressure increases.

The control pressure is introduced via the external channel 44 into the control chamber 4. Thus, the control piston 7 moves downwardly. The outlet valve 5, 6 of the control valve 5, 6, 43 is thereby closed and the inlet valve 5, 43 is opened. The control air flows through the inlet valve 5, 43 into the reaction chamber 41 and pressurizes on one hand the reaction surface 11, and on the other hand the surface of the relay piston 40. The relay piston 40 activates the relay valve 12, 13, 15, which releases into the outlet chamber 21 and thereby, via the brake connections 14, 20, to the cylinders of the wheel brakes so that a pressure which is essentially identical to the pressure in the reaction chamber 41 is conveyed thereto.

In the initial entrance phase, which is characterized by a low control pressure, the control air flows simultaneously through the inlet valve 3, 48 of the entrance device and through the housing channel 47 into the accessory chamber 9. In this phase, the pressure which accumulates in the reaction chamber 41 corresponds to the full control pressure, and the relay valve 12, 13, 15 also releases to the brake connections 14, 20 so that the brake pressure is essentially identical to the control pressure. The control pressure continues to flow through the path described into the accessory chamber 9 until it reaches a value at which the force of the adjustable spring 52 is overcome. This pressure value is the entrance pressure. When the entrance pressure is reached, the entrance piston 51 moves upward against the force of the adjustable spring 52 into a position in which the entrance valve 3, 48, 49 assumes a closed position. Another increase in the pressure in the accessory chamber 9 while the control pressure is increasing is thereby prevented. The pressure in the accessory chamber 9 remains constant in the subsequent operational phases.

Alternatively, in an arrangement not illustrated, the entrance device may include an additional graduated chamber which is pressurized with the control pressure so that the pressure in the accessory chamber 9 may be reduced when the control pressure continues to increase which results in an expansion of the range of possible control ratios.

During the next control phase, namely, the second phase, with an increasing control pressure, the pressure in the outlet chamber 21 is controlled and thereby the brake pressure to the brake connections 14, 20 corresponds to the ratio of the control surface 45 to the reaction surface 11.

During both the entrance phase and the control phase, the graduated piston 18, 19 is held against its stop by means of the reaction force.

In another arrangement not illustrated, in which the supply pressure does not exert any free force on the graduated piston 18, 19 in its direction of displacement, the reaction force is produced by the control spring.

During the subsequent advanced control phase, namely, the third phase, begins when the reaction force acting on the graduated piston 18, 19 is overcome by the force exerted on the second control surface 29 of the graduated piston 18, 19 by the control pressure.

At this point, the graduated piston 18, 19 is moved upwardly away from the stop 30 toward the outlet chamber 21, whereby the relay valve 12, 13, 15 is opened by the tappet 40a of relay piston 40. From the piston supply chamber 17, additional supply air now flows into the outlet chamber 21, whereby the brake pressure which is present in the outlet chamber 21 from the start of the control phase undergoes an increase. The equilibrium of forces on the relay piston 40 is thereby eliminated, and the relay piston 40 moves upward against the ribs 42 which are attached to the housing and which serve as a stop. The graduated piston 18, 19 follows this movement when the relay valve 12, 13, 15 is open. The relay valve 12, 13, 15 remains open until there is a reestablishment of an equilibrium of forces on the graduated piston 18, 19. The brake pressure which is necessary is increased on the basis of the ratio of surface areas on the graduated piston 18, 19 in relation to the control piston, and raised in relation to the control ratio of the expected level of brake pressure.

When the equilibrium of forces is established, the graduated piston 18, 19 is moved back by the closing stroke of the relay valve 12, 13, 15, and the relay valve 12, 13, 15 assumes a closed position.

In the control phase, the brake pressure released is determined exclusively by the graduated piston 18, 19. The brake pressure control piston 7, 10 is not effected in this phase. When there is an increase in the control pressure, the graduated process described above is repeated.

When the control pressure drops, the sequence of operations described above occurs in reverse order in all phases.

Figure 2:
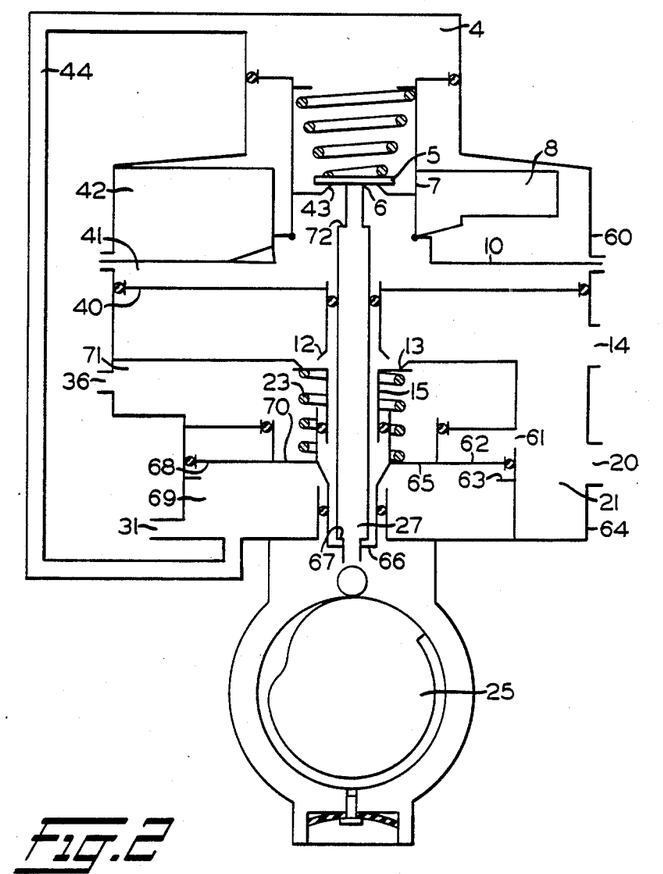
FIG. 2 shows schematically a load-controlled braking apparatus with a second activation mechanism for the control valve.

Referring now to FIG. 2, there is shown a schematic view of a controller relay ALB with two activation mechanisms for the control valve.

The reference numbers employed in FIG. 2 correspond to those used in FIG. 1 for the same parts which perform the same function.

As shown in FIG. 2, the control valve 5, 6, 43 is activated by the control piston 7, 10 in which the outer periphery is clamped between the mating surfaces of the upper housing 60 and the lower housing 64. Disposed immediately below the control valve 5, 6, 43 is the relay piston 40 which operates the relay valve 12, 13, 15.

It will be noted that a valve tappet or rod 27 is located between the cam 25 which is situated in the lower housing 64 and the control valve 5, 6, 43. The valve tappet 27 passes through the valve element 15 of the relay valve 12, 13, 15 and is guided in a sealed manner through the relay piston 40. The tappet 27 includes diameter change which forms a driving shoulder 67 located on the lower end.

As shown, the lower housing 64 includes a driver piston 65, 66 which is guided in a sealed manner and which is designed as a graduated piston. The walls of the lower housing 64, along with the small upper surface 70, form a supply chamber 71 which is connected to the supply connection 36. Conversely, the walls of the lower housing 64, along with the large lower surface 68, form a changeover or switching chamber 69 which is connected with the control connection 31. The upper differential surface 62 of the driver piston 65, 66 is pressurized via a housing port 61 with the brake pressure from the outlet chamber 21 which is connected to the brake connections 14, 20.

The driver piston 65, 66 accommodates the valve tappet 27. The driver piston 65, 66 includes on its underside a tubular extension, by means of which it enters the reversing chamber 69 in a sealed manner and surrounds the valve tappet 27. The lower end of the tubular extension is provided with a flanged portion which extends radially inwardly to act as a driver member 66.

The biasing spring 23 of the relay valve 12, 13, 15 is carried by the upper surface of the driver piston 65, 66. It will be seen that a stop member 63 is formed in the lower housing portion 64. The stop 63 extends into the changeover chamber 69 and limits the downward movement of the driving piston 65, 66.

The control chamber 4 is located in the upper housing portion 60 and is connected via the external channel or tube 44 with the control connection 31.

An annular shoulder or surface 72 is formed on the valve tappet 27 within the reaction chamber 41.

It is quite apparent that the embodiment illustrated in FIG. 2 can also be equipped with an entrance device.

In the explanation of the function of the embodiment illustrated in FIG. 2, it is assumed that the various elements are connected in the same manner as the embodiment illustrated in FIG. 1, with the other components of the braking system of the vehicle.

In the absence of the entrance device in the embodiment illustrated in FIG. 2, only the regulation phase and the modulation phase occur during the following description of the operation of the load-controlled braking apparatus ALB.

When the brakes are not operated during the regulation phase, the delivery pressure which acts on the small upper surface of the driver piston 65, 66 produces the reaction or retaining force which holds the driver piston 65, 66 down against the stop 63. However, during braking, this reaction force is increased by the braking pressure acting on the differential surface 62 of the driver piston 65, 66.

It is apparent that the embodiment illustrated in FIG. 2 can be designed so that the reaction force on the driver piston 65, 66 can be produced by a control spring which may be disposed between the driver piston 65, 66 and the housing 60, 64, instead of by the supply pressure.

In analyzing the operation of the embodiment illustrated in FIG. 2 in the regulation phase, it will be appreciated that the description given for the embodiment illustrated in FIG. 1 also applies accordingly. The modulation phase of this latter embodiment begins when the control pressure acting on the large lower surface 68 of the driver piston 65, 66 is sufficient enough to overcome the reaction force.

At this point, the driver piston 65, 66 is moved upwardly, and after overcoming a certain clearance resulting from the load-controlled setting of the cam 25 between the driver 66 and the drive shoulder 67 of the valve tappet 27, drives the valve tappet by means of the driver 66 and the drive shoulder 67. The brake pressure control piston 7, 10 reacts to this in accordance with the load-controlled adjustment of the valve tappet 27. Thus, the control valve 5, 6, 42 causes a higher pressure into the reaction chamber 41 via the control valve 5, 6, 43 corresponding to the new setting of the valve tappet. This allows the relay piston 40 and the relay valve 12, 13, 15 to correspondingly increase the brake pressure in the outlet chamber 21. The higher brake pressure is conveyed via the housing port 61 to act on the differential surface 62 of the driver piston 65, 66 and thus reestablishes an equilibrium of forces on the driver piston.

If the control pressure increases further, the valve tappet 27 is again driven, the control sequence described above once again takes place, and a higher brake pressure is conveyed to the outlet chamber 21.

In the advanced control phase, therefore, the regulated pressure released by the brake pressure control piston, and thus the brake pressure, is determined exclusively by the driver piston 65, 66.

When the control pressure decreases, the functional sequence described above is repeated in reverse order, whereby the valve tappet 27 is moved downwardly in the direction of decreasing brake pressure, by the force of the pressure in the reaction chamber 41 acting on its annular surface 72.

Figure 3:
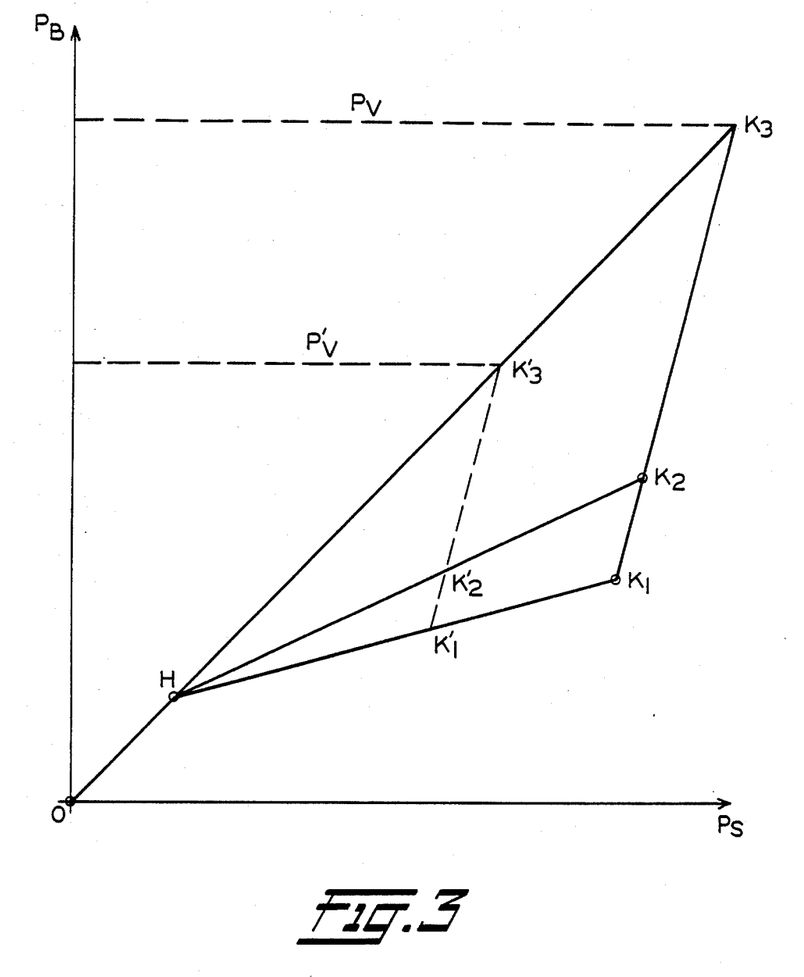
FIG. 3 shows a section of the family of characteristic curves of the load-controlled braking apparatus as shown in FIGS. 1 and 2.

Referring now to FIG. 3, there is shown a graphical illustration of a portion of the family of characteristic curves for the embodiment illustrated in FIG. 1.

It will be observed that plotted on the ordinate is the brake pressure, symbolized by $P_B$, and plotted on the abscissa is the control pressure coming from the brake valve, symbolized by $P_S$. A dashed line parallel to the abscissa represents the supply pressure, designated as constant, and symbolized by $P_V$.

The segment OH of the curve represents the entrance phase. In this segment, brake pressure $P_B$ is essentially proportional to control pressure $P_S$. On the same pressure scales on the ordinate and abscissa, the segment OH runs at an angle of 45° with respect to both coordinates.

In the control phase, the control characteristics for the partly-loaded vehicle are slightly deflected in the direction of lower values for brake pressure $P_B$ from the 45° line with H as the salient point whereby the entirety of the control curves represents a bundle of rays with H as the midpoint.

For example, for this bundle of rays, the control characteristics for the unloaded vehicle $HK_1$, the partly-loaded vehicle $HK_2$, and for the fully-loaded vehicle $HK_3$ are shown, all without taking into consideration dynamic displacements of axle loads.

The characteristic curve $HK_3$ for the fully-loaded vehicle is essentially the extension of the original characteristic OH and shows that the control pressure $P_S$ is essentially fully released as the brake pressure $P_B$. The point $K_3$ is the control point, at which brake pressure $P_B$ is the same as the supply pressure $P_V$ and beyond which brake pressure $P_B$ cannot increase any further.

In the advanced control phase, the load-controlled characteristics curves HK, with the exception of that of the fully-loaded vehicle, are deflected sharply in the direction of higher brake pressures $P_B$, and run on a new line at a sharp angle to the control point $K_3$. In the advanced control phase, the line $K_1K_3$ is the control characteristic for the unloaded vehicle, and the line $K_2K_3$ is the control characteristic for the partly-loaded vehicle. The characteristics for the vehicle with other load conditions are deflected correspondingly, whereby the salient points always lie on the line $K_1K_3$.

The position of the salient point H can be predetermined by the ratio of surfaces on the graduated piston 18, 19 and is also a function of the absolute value of the reservoir pressure, and to an extent determined by the slope of the line $K_1K_3$ of the control ratio set by the relay ALB, in other words, of the load status of the vehicle. The slope of the line $K_1K_3$ can be predetermined by the above-mentioned ratios of surface areas.

If there is a failure of the supply pressure in the vehicle, the beginning of the advanced control phase is shifted to lower values of control pressure $P_S$. Such a case is characterized, for example, by the dotted line $K'_1K'_2K'_3$. In this case, the supply pressure, which is again specified as constant, has dropped to a value $P'_V$. The beginning of the advanced control phase for the unloaded vehicle is thereby shifted from the control pressure $P_S$, identified by the point $K_1$, to a lower value marked by the point $K'_1$. The intersections $K'$ of the other load controlled control characteristics, e.g. $K'_2$ and the release point $K'_3$, are shifted accordingly.

The advanced control phase of the controller relay ALB corresponds to an emergency situation. It will be noted that FIG. 3 clearly shows that in this emergency situation, independent of the control ratio of the controller relay ALB and independent of the level of the supply pressure, a brake pressure higher than that of the current control setting can be conveyed to the cylinders of the wheel brakes rapidly, steadily, and securely, up to the available supply pressure.

The characteristics of embodiments that do not have entrance devices, the preceding remarks apply accordingly, with the exception that the point H forms the starting point of the coordinate system.

Such a response characteristic is exhibited by the embodiment illustrated in FIG. 2. Here, the position of the salient points K and K', in addition to the predetermined control ratio, is a function of the ratio of surface areas on the driver piston 65, 66 and of the absolute value of the supply pressure. The slope of the line $K_1K_3$ or $K'_1K'_3$ is also a function of the ratio of the surface areas on the driver piston 65, 66.

For the configurations of the arrangements illustrated in FIG. 1 and FIG. 2 in which the reaction force on the graduated piston or on the driver piston is produced by a control spring, the remarks pertaining to the family of characteristic curves shown in FIG. 3 apply as appropriate, with the exception that when the supply pressure $P_V$ drops, the salient points K are not shifted to lower values of control pressure $P_S$. This means that in these embodiments, an advanced control phase will only continue as long as the supply pressure is higher than the control pressure $P_S$ corresponding to the salient point K of the current control line. Therefore, in these embodiments the emergency situation is defined by the absolute value of the control pressure $P_S$.

Figure 4:
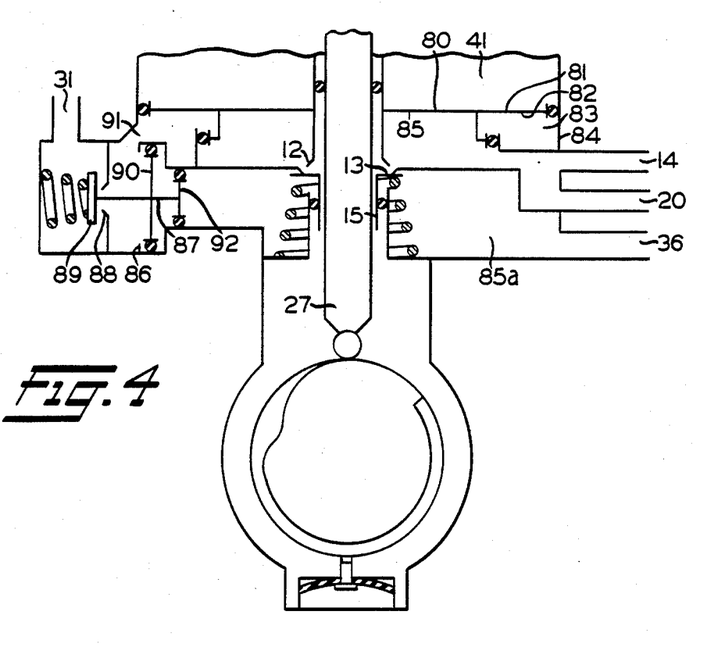
FIG. 4 shows schematically a section of a load-controlled braking apparatus with means on the relay piston for influencing the control characteristic in accordance with the invention.

Referring now to FIG. 4, there is shown a schematic representation of a portion of a controller relay ALB with a unique arrangement for engaging the relay piston for the execution of the advanced control phase.

The various components of FIG. 4 which have the same functions are again identified with the same reference numbers as those in FIG. 1.

In the upper portion (not shown), as in the embodiment described above, there is located the brake pressure control piston 7, 10, the control valve 5, 6, 43, the control chamber 4 and, optionally, the entrance device. The valve tappet 27, which can be adjusted by the cam 25, passes through the relay piston 80 in a sealed manner and acts on the control valve 5, 6, 43 and the brake pressure control piston 7, 10.

The relay piston 80 in this embodiment is designed as a differential piston with a large upper control surface 81 and with a smaller lower reaction surface 85. The differential surface 82, which compensates for the difference between these surfaces, is also located on the underside of piston 80.

The reaction surface 85 of the relay piston 80 defines an outlet chamber 21. A differential chamber 83 is formed between the differential surface 82 and the housing 84. The differential chamber 83 can be connected via a housing duct 91 and a pressure relief valve 88, 89 to the control connection 31.

The pressure relief valve 88, 89 is formed by a valve element 89 which is urged against a valve seat 88 fastened to the housing by a compression biasing spring 93.

The pressure relief valve 88, 89 and the wall of the housing define a supply chamber 85a which is designed as a graduated bore. A graduated piston 87 can be guided longitudinally in chamber 85a in a sealed manner. The graduated piston 87 includes a small surface 92 communicating with the supply chamber 85a and includes a large surface 90 adjacent to the pressure relief valve 88, 89. Thus, the valve element 89 can be actuated by means of an extension tube.

The movement of the graduated piston 87 in the direction of the pressure relief valve 88, 89 is limited by a stop 86 formed in the housing.

In the explanation of the function of the embodiment illustrated in FIG. 4, it will be apparent that it is substantially the same as for FIG. 1. When the supply connection 36 is connected to a reservoir, the brake connections 14, 20 which are connected to the wheel brakes are pressurized in accordance with the pressure on the control connection 31 and the control chamber 4.

When the brakes are not in operation, the reaction chamber 41, the outlet chamber 21, and the differential chamber 83 are vented or exhausted. The graduated piston 87 is held by the supply pressure against the housing stop 86 and thus holds the pressure relief valve 88, 89 open.

When the brake valve is activated, first of all, in the manner described above and dependent on the equipment, the entrance and control phases take place, or only the control phase takes place. During this phase, the pressure relief valve 88, 89 is held open by the graduated piston 87, and the differential chamber 83 and thereby the differential surface 82 is pressurized with the control pressure by means of the control connection 31. At the same time, the control pressur pressurizes the large surface 90 of the graduated piston 87.

The advanced control phase begins when the control pressure acting on the large surface 90 of the graduated piston 87 overcomes the force exerted by the supply pressure on the smaller surface 92 of the graduated piston 87. At this point, the graduated piston 87 is moved away from the housing stop 86 toward the supply chamber, whereby the pressure relief valve 88, 89 closes under the action of the biasing spring 93.

The pressure in the differential chamber 83 can now only increase, with the result that when the control pressure increases further, the relay piston 80 via the relay valve 12, 13, 15, releases a brake pressure into the outlet chamber 21 which is higher than the regulated pressure released by the control valve 5, 6, 43 that is existing in the reaction chamber 41.

The control pressure at which the pressure relief valve 88, 89 closes, determines the salient points for all the control characteristics of the bundle of lines. In contrast to the embodiments described above, the geometric location of the salient points is therefore a line parallel to the ordinate at the interval of the limit pressure of the pressure relief valve 88, 89.

When the control pressure increases further, each control characteristic, starting from its salient point, continues with a slope determined by the ratio of surface areas on the relay piston 80, until the brake pressure is equal to the control pressure. If the control pressure increases further, this equality remains until the full available supply pressure is reached. In a family of characteristics, as shown in FIG. 3, this behavior is represented so that each control characteristic runs up from its salient point with the indicated slope to the 45° line, and after reaching it, continues until reaching the available supply pressure. The bundle of lines therefore forms, on that side of the salient point, a family of parallel lines which unite into it after reaching the 45° line.

When the supply pressure drops, the geometric location of all lines parallel to the ordinate forming salient points shifts in the direction of lower values for the control pressure. From this shifted starting point on, the present embodiment then displays the characteristic described.

It will be apparent to a specialist in the field that for the control of the pressure relief valve 88, 89, instead of the graduated piston 87, a control spring can also be used. In this case, during a decreasing supply pressure, the lines parallel to the ordinate forming the geometric location of all the salient points would not shift, and its position would therefore be a function only of the absolute value of the control pressure.

It is apparent that the embodiment illustrated in FIG. 4 can be executed to special advantage with pressure increasing or pressure reducing embodiments of the relay valve.

It is apparent to the specialist in the field that what has been said for all of the embodiments for the case of decreasing supply pressure is correspondingly true for the case of increasing supply pressure.

In an embodiment not illustrated in FIG. 4, the differential chamber 83 can be connected by a valve to the outlet chamber 21. The valve may be controlled by a graduated piston, which is pressurized on its large surface by the control pressure, on its small surface by the brake pressure from the outlet chamber 21, and on the differential surface by the supply pressure.

The valve and thus the connection between the differential chamber 83 and the outlet chamber 21 is open as long as the sum of the forces from the supply pressure and the brake pressure on the graduated piston exceeds the force exerted on the latter by the control pressure.

The valve and thus the connection between the differential chamber 83 and the outlet chamber 21 is closed when the force exerted on the graduated piston by the control pressure exceeds the sum of the forces exerted on the graduated piston by the supply pressure and the brake pressure.

The advanced control phase of this latter assumed embodiment starts with the closing of the valve.

For the characteristic of this embodiment, the remarks made in relation to the embodiments illustrated in FIGS. 1 and 2 and the family of characteristics illustrated in FIG. 3, apply correspondingly to the full extent as described above.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly claimed in what is claimed. It will be understood that variations, modifications, equivalents and substitutions for components of the above specifically-described embodiment of the invention may be made by those skilled in the art without departing from the spirit and scope of the invention as set forth in the appended claims.

Having thus described the invention, what we claim as new and desire to secure by Letters Patent is:

1. A load-controlled brake force controller system for pneumatically operated wheel brakes of a vehicle and/or trailer braking system, comprising:
   (a) a housing including a load-controlled brake pressure controller for regulating as a function of the load a control pressure released by a brake valve;
   (b) a relay valve connected in series relationship with said brake pressure controller to cause compressed air to be introduced to the wheel brakes from a reservoir when said brake valve is activated;
   (c) said relay valve being activated by a relay piston which is pressurized toward an open direction of said relay valve by the regulated control pressure and toward a closed direction of the relay valve by the brake pressure in an outlet chamber which is connected to the wheel brakes and which can be connected by said relay valve to the reservoir;
   (d) means for providing a graduated increase of the brake pressure beyond the value corresponding to the current control ratio up to the available supply pressure; and
   (e) said means being adapted to go into operation at a predetermined control pressure.

2. The load-controlled brake force controller system, according to claim 1, wherein said load-controlled brake pressure controller includes:
   (a) a graduated brake pressure control piston having a small control surface which is pressurized by the control pressure supplied to a control chamber and having a reaction surface the size of which can be varied and which is pressurized in a reaction chamber with the pressure modulated by a control valve; and
   (b) said control chamber is connected to said reaction chamber for venting to atmosphere by a control valve which is activated by said graduated brake pressure control piston having a control ratio which is adjusted as a function of the load by a control element.

3. The load-controlled brake force controller system, according to claim 2, wherein:
   (a) said relay piston and said relay valve coaxially positioned with respect to said brake pressure control piston whereby said relay piston cooperates with the reaction surface of said brake pressure control piston and said reaction chamber.
   (b) said control element is moved by a valve tappet which coaxially enters a valve element of said relay valve and said relay piston and is guided in a sealed manner in said relay piston.

4. The load-controlled brake force controller system, according to claim 2, wherein said operating means being connectable to said relay valve.

5. The load-controlled brake force controller system, according to claim 4, wherein said working means includes two activating devices which cause the control pressure to move said relay valve in the open direction and the supply pressure to move said relay valve in the opposite direction.

6. The load-controlled brake force controller system, according to claim 5, wherein one of said two activating devices includes:
   (a) a portion of said housing on the side of the outlet chamber which is opposite to said relay piston and coaxial with said relay piston, a graduated bore having a small diameter facing said relay piston and a large diameter facing away from said relay piston;
   (b) a graduated piston located in said graduated bore and enclosed by end pieces and being hollow in the longitudinal direction, and being guided to move axially in a sealed manner and having radial outside surfaces which are sealed against the corresponding mating surface;
   (c) a step located between the two diameters so that said graduated piston fits into said graduated bore and defining an annular chamber which is in communication with a supply connection;
   (d) the small end surface of said graduated piston facing the relay piston includes a circular cutout section having a circumference which is designed as an inlet valve seat;
   (e) a hollow valve element of said relay valve takes the form of a double valve element which is guided in a sealed manner in said graduated piston and is urged by a biasing spring located between said graduated piston and said valve element against said inlet valve seat;

(f) said graduated piston having a piston supply chamber located between said graduated piston and said valve element and which is in communication with said annular chamber;

(g) the large end surface of the graduated piston facing away from the relay piston takes the form of a second control surface which adjoins a housing chamber connected with a control connection and takes the form of a second control chamber;

(h) the inside space of said graduated piston includes an exhaust channel and the inside space of said valve element is vented to atmosphere;

(i) a first stop is formed as an integral part of the housing against which the graduated piston is urged by the supply pressure in said annular chamber; and (k) a second stop is formed as an integral part of the housing which limits the movement of said relay piston toward the opening direction of said relay valve.

7. The load-controlled brake force controller system, according to claim 6, wherein said annular chamber holds a reaction spring which is supported between the graduation of said graduated bore and said graduated piston.

8. The load-controlled brake force controller system, according to claim 6, wherein said graduated bore accommodates said graduated piston which is a two-stage device.

9. The load-controlled brake force controller system, according to claim 4, wherein said second activation means for said relay valve takes the form of an adjustable means responsive to the control pressure in the opening direction of said relay valve and responsive to a biasing control spring in the opposite direction.

10. The load-controlled brake force controller system, according to claim 9, wherein:

(a) said graduated bore and/or said graduated piston are designed so that the supply pressure which is conveyed to the annular chamber exerts no external force on the graduated piston in the direction of movement of the latter; and (b) said biasing control spring is supported between one end surface in the graduated piston and said housing.

11. The load-controlled brake force controller system, according to claim 3, wherein said operating means being operated by said relay piston.

12. The load-controlled brake force controller system, according to claim 11, wherein:

(a) said relay piston is a differential piston having a large control surface and a smaller reaction surface and a differential surface;

(b) said differential surface and said housing define a differential chamber which is pressurized with the control pressure through a pressure relief valve; and (c) said pressure relief valve is controlled by the supply pressure on its small surface and on its large surface up to the closing of the pressure relief valve and by the graduated piston pressurized by the control pressure in the differential chamber which is limited to a value determined by the ratio of surface areas on the graduated piston.

13. The load-controlled brake force controller system, according to claim 12, wherein said operating means being connectable to said control valve.

14. The load-controlled brake force controller system, according to claim 13, wherein said operating means is provided with a second activating means for connection to said control valve which is adjustable by the control pressure in the opening direction of the control valve and by the supply pressure in the opposite direction.

15. The load-controlled brake force controller system, according to claim 14, wherein said second activation means includes the control element which takes the form of a valve tappet which cooperates with said control valve.

16. The load-controlled brake force controller system, according to claim 15, wherein said second activation means includes:

(a) a driver which cooperates with said control element to be driven regardless of the current control ratio in the opening direction of said control valve;

(b) said driver is activated by a graduated driver piston; and (c) said driver piston is pressurized on its large surface in the direction of the full load position of said control element by the control pressure, and in the opposite direction on its smaller surface by the supply pressure, and on its differential surface by the brake pressure.

17. The load-controlled brake force controller system, according to claim 16, wherein:

(a) said driver piston is a single member which is guided in the housing so that it can move longitudinally in a sealed manner; and (b) said control element is inside said driver piston and includes a drive shoulder cooperatively associated with said driver.

18. The load-controlled brake force controller system, according to claim 17, wherein:

(a) said valve element of said relay valve is guided in a sealed manner in said driver piston; and (b) said biasing control spring is supported between said valve element of said relay valve and said driver piston.

19. The load-controlled brake force controller system, according to claim 18, wherein an entrance device having an accessory surface which corresponds to the control surface of the brake pressure control piston and wherein the difference between the control surface and a reaction surface is controlled by pressure in an accessory chamber with the control pressure up to a predetermined pressure.

* * * * *